(12) United States Patent
Druecke et al.

(10) Patent No.: US 6,649,251 B1
(45) Date of Patent: Nov. 18, 2003

(54) LIGHTWEIGHT, BREATHABLE, SONIC-BONDED PROTECTIVE OUTER GARMENTS

(75) Inventors: Frank Gerald Druecke, Oshkosh, WI (US); James Jay Tanner, Winneconne, WI (US); Richard Howard Bell, Tucson, AZ (US)

(73) Assignee: Kimberly- Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 08/902,171

(22) Filed: Jul. 29, 1997

(51) Int. Cl.$^7$ .......................... B32B 27/14; B32B 27/12
(52) U.S. Cl. .................. 428/198; 442/394; 442/398
(58) Field of Search ................... 442/394, 398; 428/198

(56) References Cited

U.S. PATENT DOCUMENTS

| | | | |
|---|---|---|---|
| 4,408,357 A | | 10/1983 | Toth .............................. 2/114 |
| 5,409,761 A | * | 4/1995 | Langley ...................... 128/849 |
| 5,560,974 A | * | 10/1996 | Langley |
| 5,682,618 A | * | 11/1997 | Johnson et al. ................. 2/275 |
| 5,695,868 A | * | 12/1997 | McCormack ............... 428/516 |
| 5,804,517 A | * | 9/1998 | Ishii et al. ................... 442/361 |
| 5,855,999 A | * | 1/1999 | McCormack ............... 428/516 |
| 5,910,225 A | * | 6/1999 | McAmish et al. .......... 156/229 |

OTHER PUBLICATIONS

AATCC Test Method 127–1977, "Water Resistance: Hydrostatic Pressure Test," *Technical Manual of the American Association of Textile Chemists and Colorists*, reaffirmed 1977, p. 242.

American Society for Testing Materials (ASTM) Designation: D 1876–72 (Reapproved 1983), Standard Test Method for Peel Resistance of Adhesives (T–Peel Test), pp. 139–142, published Oct. 1972.

American Society for Testing Materials (ASTM) Designation: E 96–80, "Standard Test Methods for Water Vapor Transmission of Materials," pp. 776–785, published Feb. 1981.

"frogg toggs Warm Weather Rain Gear," Chandlery, *Practical Sailor*, Nov. 1, 1996, p. 18.

* cited by examiner

*Primary Examiner*—Ula Ruddock
(74) *Attorney, Agent, or Firm*—Gregory E. Croft (57) ABSTRACT

An inexpensive breathable protective outer garment is produced from a breathable laminated fabric having a breathable film adhesively bonded to a nonwoven fabric. The film constitutes the outer layer of the garment and the nonwoven layer is on the inside. The seams of the garment are ultrasonically bonded such that the film sides of the laminate are in contact with each other during seaming.

8 Claims, 7 Drawing Sheets

LIGHTWEIGHT, BREATHABLE, SONIC-BONDED PROTECTIVE OUTER GARMENTS

BACKGROUND OF THE INVENTION

Garments to provide protection from the weather have been available for many years. Early garments were made using water impermeable materials (e.g. rubber-coated textiles) which were cut and sewn into garments. The seams were then sealed with polymers to preclude leakage of moisture inward to the wearer. These garments provided the desired weather protection but were not comfortable. In particular, they were heavy and prevented dissipation of body moisture transpired by the wearer (non breathable garment). Attempts were made to address the lack of breathability by incorporating vents under the arms and/or along the upper back to enable perspiration vapor to escape. To retain the water impermeability, however, more fabric was added to these vents in the form of a rain shield or drape to preclude rain or water coming into the vent holes. This significantly reduced the venting action and made the garment heavier.

Next, to address the weight issue, lighter weight and lower cost materials were used (e.g. polyvinyl chloride) with same or similar garment design. The seams were made by continuous heat bonding the cut pieces of material together to provide the water impermeable seams. However, these lighter weight and lower cost protective garments were still not comfortable due to their inability to adequately vent the wearer's body-transpired moisture.

When breathable materials were invented, such as GoreTex®, new garments were made using these fabrics. Since supporting textiles are used to provide strength to the breathable film, special sewn seams are needed to preclude inward leakage. Both the breathable fabric and the seams, which require hand work, raise the cost of manufacturing of such garments. The lower cost continuous heat bonding method used to make seams on the less expensive vinyl garments do not work on the laminated breathable films due to puckering, burn-through or lack of penetration caused by the inability to heat-fuse dissimilar materials. Consequently, although these weather protective garments are lighter in weight than the early rubber-coated textile garments and are breathable, they are also very expensive. While a lightweight, non breathable vinyl jacket might cost about five dollars, a comparable jacket made from a fabric-backed breathable film might cost about one hundred dollars.

Accordingly there remains a need for inexpensive, lightweight, breathable protective outer garments.

SUMMARY OF THE INVENTION

It has now been discovered that a lightweight, breathable protective outer garment can be made at a low cost. This is attained by using certain breathable laminated fabrics and discontinuous sonic bonding to create an acceptable weather resistant seam with adequate strength. The new seaming technique permits a different garment pattern, both of which in combination result in a much lower cost garment assembly using the lightest weight breathable laminate available. Examples of such garments include ponchos, parkas, jackets and pants.

Hence in one aspect, the invention resides in a weather-protective outer garment, such as a rain parka or poncho, consisting essentially of a breathable laminated fabric comprising a polyolefin nonwoven fabric discontinuously bonded to a foraminous polyolefin film with an adhesive, such as a water-based or polyurethane adhesive, said laminated fabric oriented such that the polyolefin film side of the fabric is the outward-facing surface of the garment, said garment having one or more discontinuously ultrasonically bonded seams in which the polyolefin film sides of two laminated fabric edges are melted together, said seam(s) having a strength of about 2000 grams per inch of seam width or greater, and said laminated fabric having a basis weight of about 80 grams per square meter or less, a hydrohead of about 50 centimeters or greater, and a breathability of about 1000 grams per square meter per 24 hours or greater.

Suitable laminated fabrics include those disclosed in copending application Ser. No. 08/680,890 filed Jul. 16, 1996 entitled "Process of Manufacturing a Water-Based Adhesive Bonded, Sovent Resistant Protective Laminate" (F. G. Druecke et al.), which is hereby incorporated by reference. Other suitable laminated fabrics include any breathable, ultrasonically bondable laminate having a hydrohead of about 50 centimeters or greater.

As used herein, "seam strength" is determined by a standard test for Peel Resistance of Adhesives (T-Peel Test) in accordance with ASTM D 1876-72 (reapproved 1983). The seams in the garments of this invention can have a seam strength of from about 2000 grams per inch of seam width or greater, more specifically from about 2000 to about 7000 grams per inch, and still more specifically from about 2500 to about 3000 grams per inch.

As used herein, "hydrohead" is a measure of a material's resistance to liquid penetration as determined in accordance with the standard hydrostatic pressure test AATCCTM No. 127-1977. The hydrohead of the laminated fabric used to construct the garments of this invention can be about 50 centimeters or greater, more specifically from about 100 to about 200 centimeters, and still more specifically from about 100 to about 150 centimeters.

As used herein, the "breathability" for the materials useful for purposes of this invention is the water vapor transmission rate (WVTR) calculated in accordance with ASTM Standard E96-80. Circular samples measuring three inches in diameter are cut from each of the test materials and a control which is a piece of CELGUARD® 2500 film from Hoechst Celanese Corporation of Sommerville, New Jersey. CELGUARDO® 2500 film is a microporous polypropylene film. Five samples are prepared for each material. The test dish is a number 60-1 Vapometer pan distributed by Thwing-Albert Instrument Company of Philadelphia, Pa. One hundred millimeters of water are poured into each Vapometer pan and individual samples of the test materials and control material are placed across the open tops of the individual pans. Screw-on flanges are tightened to form a seal along the edges of the pan, leaving the associated test material or control material exposed to the ambient atmosphere over a 6.5 centimeter diameter circle having an exposed area of approximately 33.17 square centimeters. The pans are placed in a forced air oven at 100° F. (32° C.) for 1 hour to equilibrate. The oven is a constant temperature oven with external air circulating through it to prevent water vapor accumulation inside. A suitable forced air oven is, for example, a Blue M Power-O-Matic 60 oven distributed by Blue M Electric Company of Blue Island, Ill. Upon completion of the equilibration, the pans are removed from the oven, weighed and immediately returned to the oven. After 24 hours, the pans are removed from the oven and weighed again. The preliminary test water vapor transmission rate values are calculated as follows:

Test $WVTR$=(grams weight loss over 24 hours)×315.5 g/m²/24 hrs

The relative humidity within the oven was not specifically controlled.

Under predetermined set conditions of 100° F. (32° C.) and ambient relative humidity, the WVTR for the CEL-GUARD® 2500 control has been determined to be 5000 grams per square meter for 24 hours. Accordingly, the control sample is run with each test and the preliminary test values are corrected to set conditions using the following equation:

$WVTR$=(Test $WVTR$/control $WVTR$)×5000 g/m²/24 hrs) (g/m²/24 hrs).

The breathability of the laminated fabric used to construct the garments of this invention can be about 1000 grams per square meter per 24 hours or greater, more specifically from about 1000 to about 4000 grams per square meter per 24 hours, and still more specifically from about 2500 to about 3500 grams per square meter per 24 hours.

In addition to being lightweight and effective garments, the cost of making the garments of this invention is very low due to the low basis weight of the laminated fabric and the ultrasonic seaming method. As a result of the relatively low manufacturing costs, the wholesale price of these garments (the price charged by the manufacturer to a distributor or retailer) can be, in 1997 U.S. dollars, about 20 dollars or less, more specifically about 10 dollars or less, and still more specifically from about 2 to about 8 dollars, depending on the style of the garment and the amount of fabric used. In any given year, the wholesale price in 1997 dollars can be readily determined by adjusting the then-current wholesale price using the change in the Consumer Price Index.

DETAILED DESCRIPTION OF THE DRAWING

Figure 1:
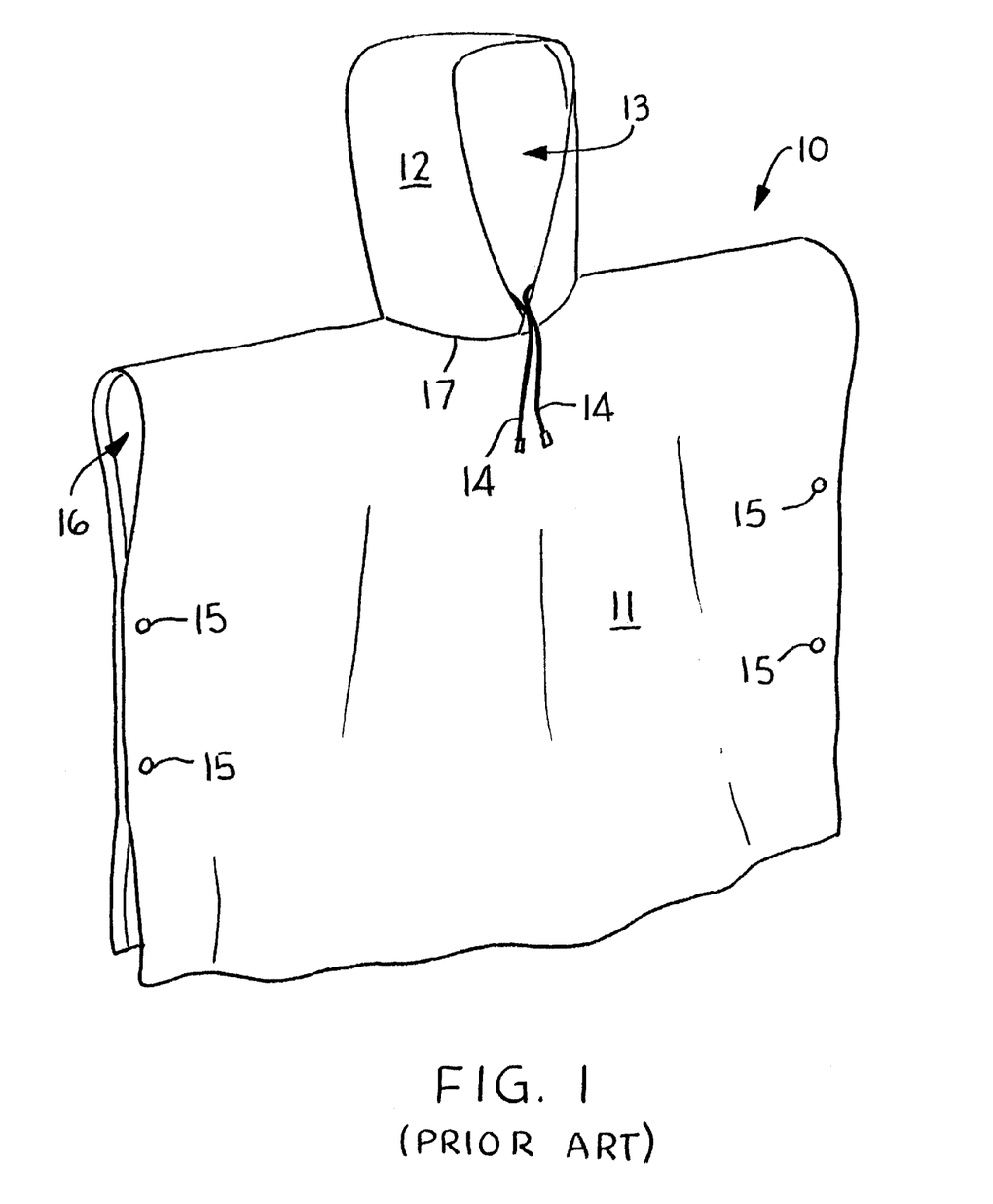
FIG. 1 is a perspective view of a poncho made of vinyl having a conventional hood design known in the prior art.

Referring to FIG. 1, shown is a conventional vinyl hooded poncho 10 found in the prior art. The poncho consists essentially of a body portion 11 and a hood 12, both of which consist of a non-breathable vinyl material. The hood opening 13 is adjustable by pulling the two ends of the drawstring 14. The sides of the poncho are closed by using the snaps 15, thus creating arm holes 16. The hood is joined to the body portion with a hood seam 17 which is typically formed by melting the vinyl at that point. Those familiar with the hood design of such garments will appreciate that a common disadvantage is that the center of the hood opening tends to be too low over the wearer's face, sometimes causing the user's vision to be impaired, especially when the drawstring is pulled tightly to keep out rain or strong winds. Of course, another disadvantage is that the garment is not breathable, although the cost is very low, typically selling at the wholesale level for only about 5 dollars or less.

Figure 2:
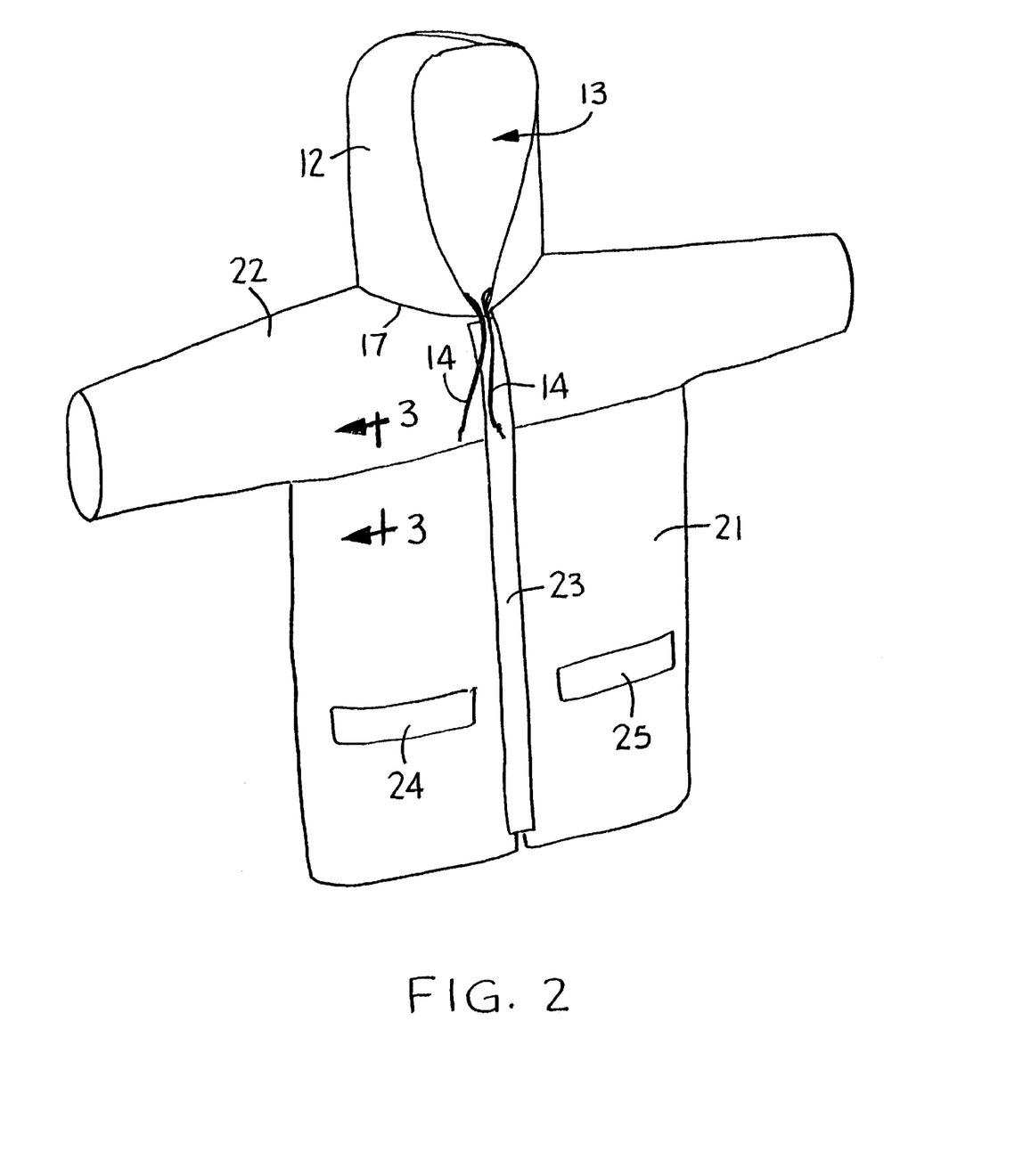
FIG. 2 is a perspective view of a parka/jacket constructed in accordance with this invention.

FIG. 2 illustrates a hooded parka/jacket garment which can be made in accordance with this invention. Shown is the hood 12, hood opening 13, body portion 21, arm portion 22, storm flap 23 which covers a full length zipper, draw string 14, pocket flaps 24 and 25 and hood seam 17. Such a garment, when made with a breathable laminate in accordance with this invention, typically weighs only about 250 grams or less. The wholesale selling price is typically about 7 dollars or less.

Figure 3:
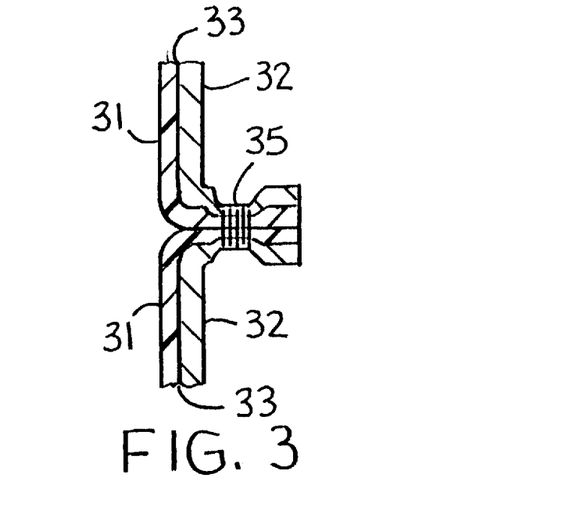
FIG. 3 is a sectional view of a seam in the garment of FIG. 2, illustrating the structure of the seam in accordance with this invention.

FIG. 3 is a sectional view of a typical seam in accordance with this invention taken along line 3—3 of FIG. 2, illustrating the sonic bonding of the laminated fabric. Shown is the outward-facing surface 31 of the garment which is a breathable polyethylene film component of the laminate. The inside surface 32 of the garment is a polypropylene nonwoven component of the laminate. The two laminate components are adhesively bonded together at their interface 33 with a water-based adhesive distributed in a discontinuous pattern to enable the laminate to breathe. The seam is formed by sonically bonding the laminated fabrics together such that the film sides of the fabrics are melted together. The area of ultrasonic-induced melting of the layers to form the bond is illustrated by bond area 35.

Figure 4:
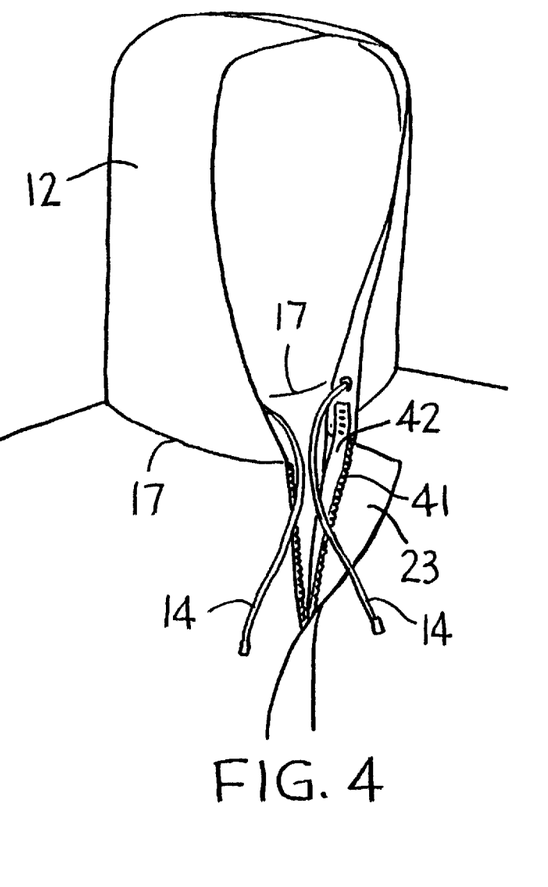
FIG. 4 is a perspective view of the hooded portion of the parka of FIG. 2, illustrating the position of the zipper and its backing relative to the hood seam.

FIG. 4 is a perspective view of a parka hood design, as shown in FIG. 2, but with the storm flap 23 partially folded back to expose the zipper 41 sewn into the garment. A particular feature of this hood design is the extension of the zipper backing 42 above the hood seam 17 about ¼ inch or more. The portion of the zipper backing which extends above the hood seam is sewn to the inside of the hood. This is desirable in order to strengthen this high stress area of the garment.

Figure 5:
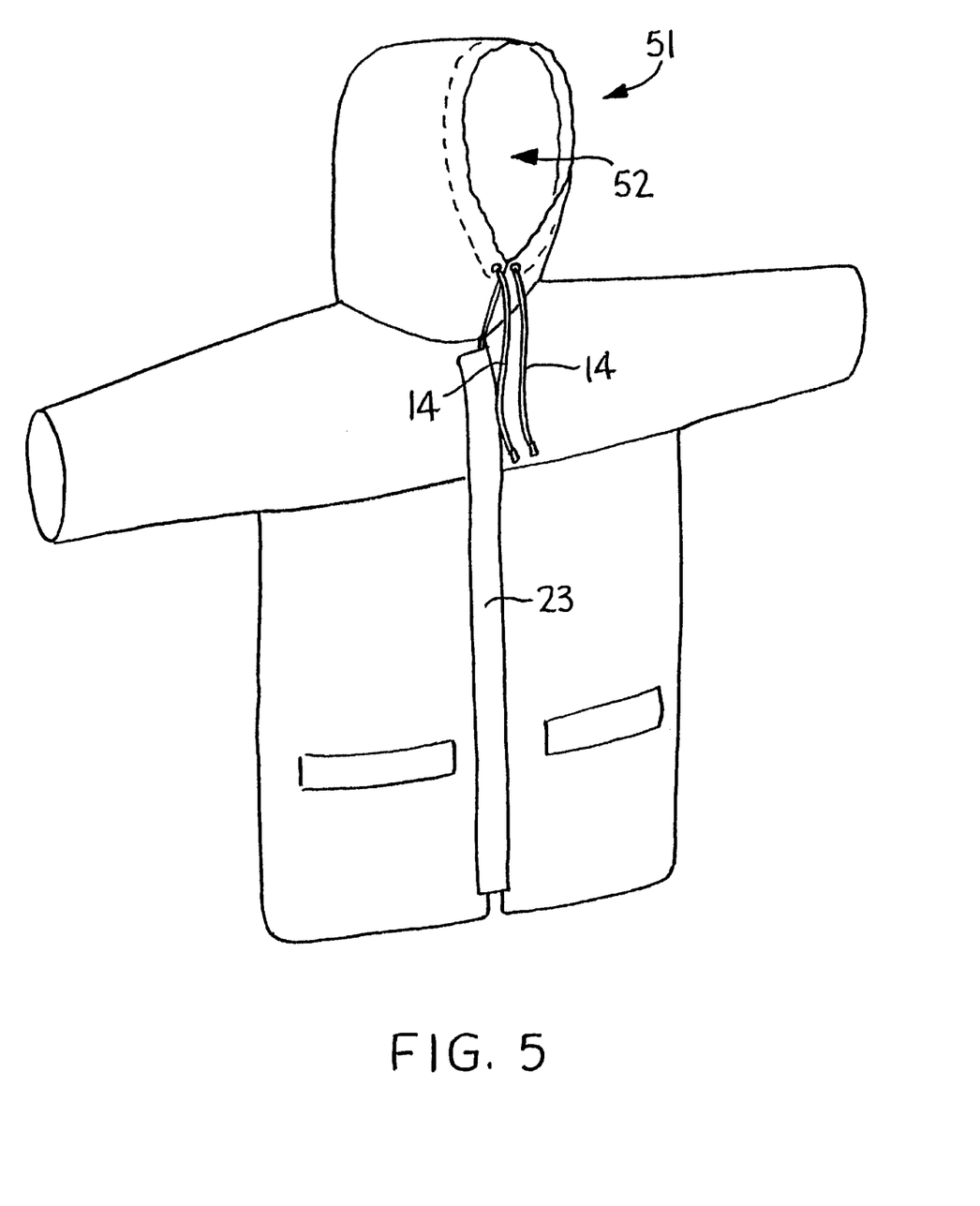
FIG. 5 is a perspective view of a parka having a "turtle" hood design in accordance with this invention.

FIG. 5 illustrates a parka in accordance with this invention having a hood design referred to as a turtle hood 51. As shown, the turtle hood design creates a tunnel-like opening 52 which projects outwardly from the wearer's face. When ordinary hooded garments are laid flat, the hood opening is substantially in the plane of the garment. In the garment of this invention, however, the hood opening projects outwardly from the plane of the garment, resulting in at least two advantages. First, the tunnel provides additional protection from the wind and rain. Second, tightening the drawstring 14 maintains the hood opening substantially centered around the wearer's eyes, so that vision is not impaired. This is aided by the fact that the bottom of the hood opening, prior to pulling the drawstrings, is about even with the wearer's chin, rather than the middle or the base of the neck.

Figure 6:
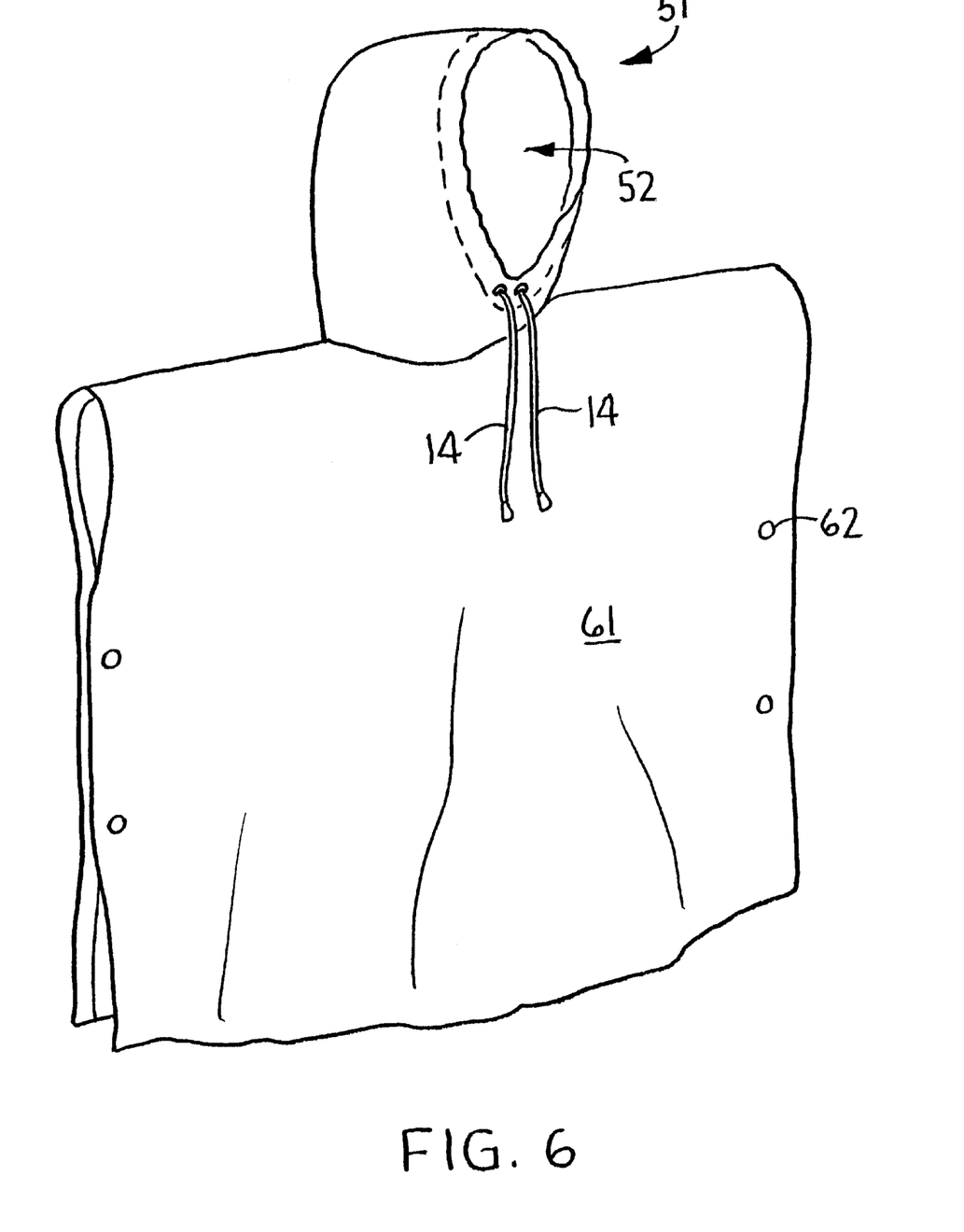
FIG. 6 is a perspective view of a hooded poncho in accordance with this invention, also having a turtle hood design.

FIG. 6 illustrates a poncho in accordance with this invention having a turtle hood as illustrated in FIG. 5. The poncho has a body panel 61 which is held together by a plurality of snaps 62.

Figure 7:
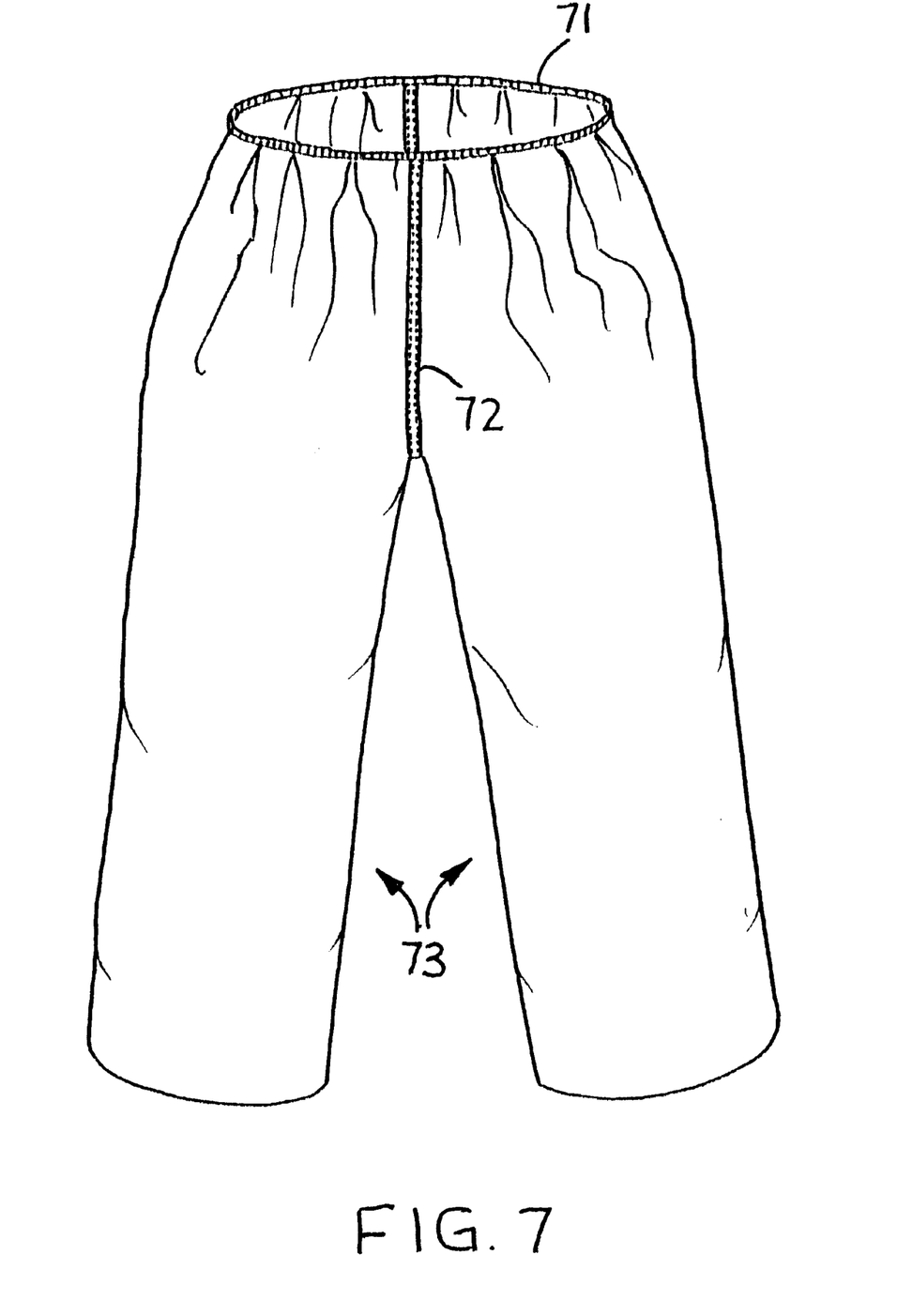
FIG. 7 is a perspective view of a pair of pants in accordance with this invention, having a specially reinforced seam.

FIG. 7 illustrates a pair of rain pants in accordance with this invention. The pants are provided with a waist elastic 71 and have a reinforced crotch seam 72 and a reinforced leg seam 73 that runs the length of the inside of both legs (not shown).

Figure 8:
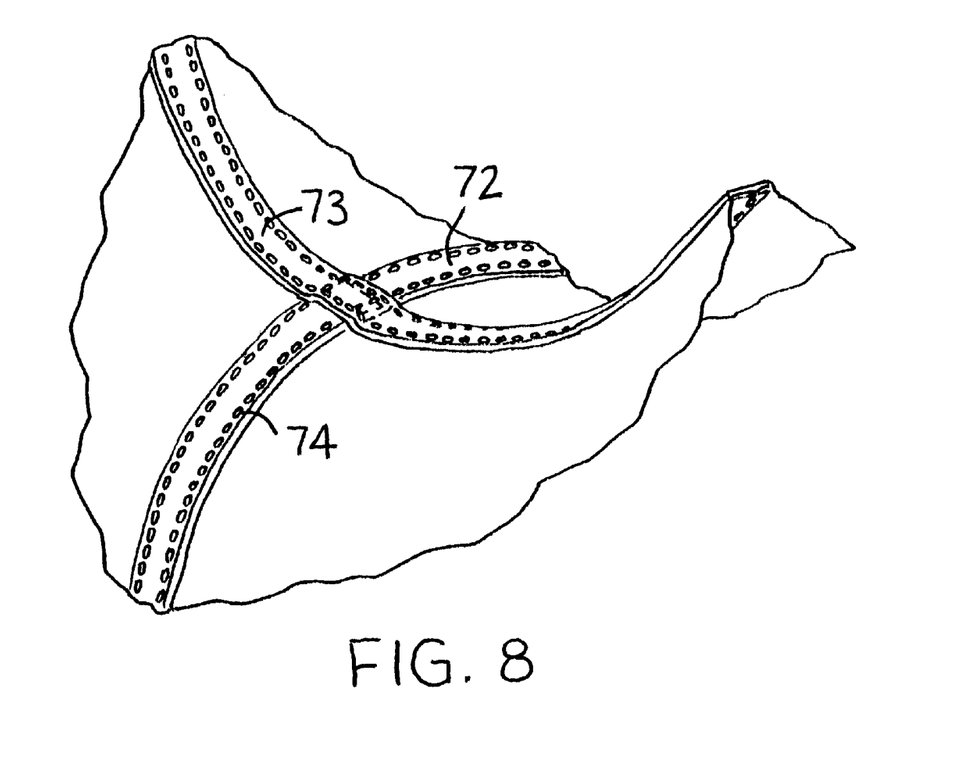
FIG. 8 is a perspective view of the crotch area of the pants of FIG. 7, illustrating the intersection of the reinforced leg seam with the reinforced crotch seam.

FIG. 8 illustrates the crotch area of the pants of FIG. 7. Shown is the reinforced crotch seam 72 and the reinforced leg seam 73. Each of the seams contains a double row of sonic bonding spots 74 which hold down the reinforced seam. Such a seam provides increased protection against water penetration.

Figures 9, 10:
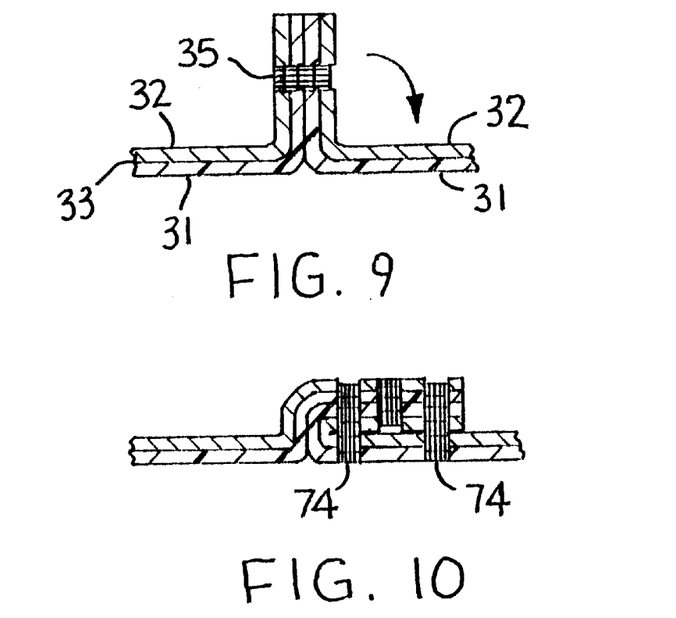
FIG. 9 is a sectional view of the first stage of forming the pants seam.
FIG. 10 is a sectional view of the final reinforced pants seam.

FIG. 9 is a sectional view of the reinforced pants seam in an intermediate stage prior to being reinforced. The seam at this point is essentially the same as the seam illustrated in FIG. 3. As illustrated by the arrow, this seam is folded over and then further sonically bonded with the double row of sonic bond spots 74. It will be appreciated that the pattern of the sonic bonds along the length of the seam can vary from that illustrated as desired, provided the bond pattern is effective in maintaining adequate seam strength.

It will be appreciated that the foregoing illustrations are not to be construed as limiting the scope of this invention, which is defined by the following claims and all equivalents thereto.

We claim:

1. A weather-protective outer garment comprising a laminated fabric of a polyolefin nonwoven fabric discontinuously bonded to a foraminous polyolefin film with an adhesive, said laminated fabric oriented such that the polyolefin film side of the fabric is the outward-facing surface of the garment, said garment having one or more discontinuously ultrasonically bonded seams which are not reinforced with an additional strip of material and in which the polyolefin film side of two laminated fabric edges are melted together, said seam(s) having a strength of about 2000 grams or greater per inch of seam width, and said laminated fabric having a basis weight of about 80 grams or less per square meter, a hydrohead of about 50 centimeters or greater, and a breathability of about 1000 grams or greater per square meter per 24 hours.

2. The garment of claim 1 wherein the seam strength is from about 2000 to about 7000 grams per inch.

3. The garment of claim 1 wherein the seam strength is from about 2500 to about 3000 grams per inch.

4. The garment of claim 1 wherein the seam is folded back onto one of the two laminated fabrics and sonically bonded to the laminated fabric.

5. The garment of claim 1 having a turtle hood.

6. The garment of claim 1 wherein the garment is a hooded parka.

7. The garment of claim 1 wherein the garment is a poncho.

8. The garment of claim 1 wherein the garment is a pair of pants.

* * * * *